(12) United States Patent
Dodge et al.

(10) Patent No.: US 7,497,077 B2
(45) Date of Patent: Mar. 3, 2009

(54) SYSTEM AND METHOD FOR DISPENSING AN AQUEOUS UREA SOLUTION INTO AN EXHAUST GAS STREAM

(75) Inventors: Lee G. Dodge, San Antonio, TX (US); Paul H. Kunkel, Poth, TX (US)

(73) Assignee: Southwest Research Institute, San Antonio, TX (US)

( * ) Notice: Subject to any disclaimer, the term of this patent is extended or adjusted under 35 U.S.C. 154(b) by 303 days.

(21) Appl. No.: 11/493,452

(22) Filed: Jul. 26, 2006

(65) Prior Publication Data

US 2008/0022663 A1  Jan. 31, 2008

(51) Int. Cl.
*F01N 3/00* (2006.01)
*B05B 7/06* (2006.01)
*B05B 7/10* (2006.01)

(52) U.S. Cl. .................. 60/286; 60/295; 239/406; 239/416.4; 239/416.5

(58) Field of Classification Search .................. 60/286, 60/295, 301; 239/399, 406, 416.4, 416.5
See application file for complete search history.

(56) References Cited

U.S. PATENT DOCUMENTS

| | | | |
|---|---|---|---|
| 4,915,036 A | 4/1990 | DeVita | |
| 4,985,218 A | 1/1991 | DeVita | |
| 5,176,325 A * | 1/1993 | Vidusek | 239/419.3 |
| 5,342,592 A | 8/1994 | Peter-Hoblyn et al. | |
| 5,431,893 A * | 7/1995 | Hug et al. | 423/239.1 |
| 5,453,258 A | 9/1995 | Lippmann et al. | |
| 5,477,685 A * | 12/1995 | Samuelson et al. | 60/737 |
| 5,603,453 A * | 2/1997 | Weaver et al. | 239/8 |
| 5,605,042 A * | 2/1997 | Stutzenberger | 60/286 |
| 5,676,071 A | 10/1997 | Horker et al. | |
| 5,732,885 A * | 3/1998 | Huffman | 239/416.5 |
| 6,279,603 B1 * | 8/2001 | Czarnik et al. | 137/339 |
| 6,293,097 B1 * | 9/2001 | Wu et al. | 60/286 |
| 6,382,600 B1 * | 5/2002 | Mahr | 261/78.2 |
| 6,444,177 B1 * | 9/2002 | Muller et al. | 422/177 |
| 6,620,391 B2 * | 9/2003 | Muller et al. | 423/210 |
| 6,722,295 B2 | 4/2004 | Zauderer | |
| 6,848,251 B2 * | 2/2005 | Ripper et al. | 60/286 |
| 2003/0109047 A1 | 6/2003 | Valentine | |
| 2005/0000220 A1 * | 1/2005 | Zauderer | 60/775 |
| 2005/0002841 A1 | 1/2005 | Moberg | |
| 2005/0013755 A1 | 1/2005 | Higgins | |
| 2005/0013756 A1 | 1/2005 | Amou et al. | |
| 2005/0235632 A1 * | 10/2005 | Tarabulski et al. | 60/282 |
| 2008/0264047 A1 * | 10/2008 | Griffiths et al. | 60/299 |

* cited by examiner

*Primary Examiner*—Thomas E Denion
*Assistant Examiner*—Jonathan Matthias
(74) *Attorney, Agent, or Firm*—Gunn & Lee P.C.

(57) ABSTRACT

An aqueous urea dosing system has a first tube through which the urea solution is conveyed to a small mixing chamber. Compressed air is continuously conveyed through an annular space between the outer surface of the first tube and the inner surface of a second tube which has a distal end that extends beyond a distal end of the first tube. The mixing chamber is positioned between the respective distal ends of the first and second tubes. The urea solution is discharged into the small mixing chamber, and subsequently immediately into an exhaust gas, in a series of discreet pulses, the width and period of which are controlled by a pulse-width-modulated flow control valve spaced from the exhaust gas.

13 Claims, 3 Drawing Sheets

SYSTEM AND METHOD FOR DISPENSING AN AQUEOUS UREA SOLUTION INTO AN EXHAUST GAS STREAM

BACKGROUND OF THE INVENTION

1. Technical Field

This invention relates generally to a system and method for dispensing aqueous solutions into an elevated temperature environment, and more particularly, to such a system and method for injecting an aqueous urea solution into an exhaust gas stream.

2. Background Art

The selective catalytic reduction (SCR) of $NO_x$ using ammonia or urea has been used for many years in industrial processes. For example, U.S. Pat. No. 4,985,218 granted Jan. 15, 1991 to Vincent A. DeVita for a SYSTEM FOR INJECTING A TREATMENT FLUID, SUCH AS A UREA AND WATER SOLUTION, INTO THE EXHAUST DUCT OF A STATIONARY INDUSTRIAL BOILER.

The U.S. Protection Agency (EPA) has set very stringent standards directed toward reducing $NO_x$ and other undesirable emissions from vehicular as well as stationary engines, and urea injection upstream of an SCR catalyst has been proposed as one way to reduce $NO_x$ emissions from vehicular engines. For example, U.S. Publication No. 205/0013756 A1, published Jan. 20, 2005 for an ENGINE EXHAUST GAS TREATMENT SYSTEM AND EXHAUST GAS TREATMENT PROCESS by Kiyoshi Amou, et al. describes an exhaust gas after treatment system for a diesel engine using urea injection upstream of an SCR selective reduction type $NO_x$ catalyst.

However, there are several problems associated with current urea injection systems. For example, in the above-referenced Amou, et al. arrangement, the urea injection valve is directly mounted on a surface that conducts the exhaust gas and is therefore prone to overheating and potential plugging of the valve. Other problems also are inherent in current systems used to inject urea-water mixtures into an elevated temperature exhaust gas. More specifically, the spray of the urea-water mixture does not flow uniformly from multiple holes in the tip of an atomizer positioned in an exhaust pipe, especially at low dosing rates. Furthermore, urea solution supply systems positioned in the exhaust system tend to plug due to partial evaporation of the water in the supply tube between the dosing valve and the atomizer tip. Slugs of urea-water mixture migrate through the supply tube and tend to preferentially spray out of only one or two of the several holes provided in the atomizer tip, a condition particularly troublesome at low liquid flow rates.

The present invention is directed at overcoming the above-described problems associated with urea-water injection. It is desirable to have a urea-water injection system, and a method of carrying out the injection, that avoids the premature mixing of air and the urea solution prior to injection into the exhaust gas stream. It is also desirable to have such a system and method whereby the urea-water solution flow control valve is remotely spaced from the elevated temperature environment of the exhaust system. It is also desirable to have such a system and method for injecting a urea-water solution into an elevated temperature exhaust gas stream that provides a thermally protective continuous flow of air around the urea-water supply tube until the solution is delivered into a small mixing chamber prior to immediate injection into the exhaust gas stream.

SUMMARY OF THE INVENTION

In accordance with one aspect of the present invention, a system for dispensing an aqueous urea solution into an exhaust gas stream includes a source of a pressurized solution of urea and water and a source of compressed air. A first elongated tube in fluid communication with the source of the pressurized solution of urea and water has a check valve disposed in a distal end. A second elongated tube that is in fluid communication with the source of the compressed air is disposed in concentrically spaced circumscribing relationship around the first elongated tube and has a distal end that extends beyond the distal end of the first elongated tube, thereby forming a mixing chamber between the distal end of the first elongated tube and the distal end of the second elongated tube. The distal end of the second elongated tube is adapted to be positioned in an exhaust conduit and has one or more openings, each of which are adapted to provide a controlled air-assisted spray of the solution of urea and water into the exhaust gas.

Other features of the system for dispensing an aqueous urea solution, in accordance with the present invention, include the mixing chamber formed between the respective distal ends of the first and second elongated tubes having a length that is less than the outer diameter of the second elongated tube. Another feature includes the system having a pulse-width-modulated flow control valve positioned between the source of the pressurized solution of urea and water and the distal end of the first elongated tube at a position spaced from the exhaust conduit.

Another feature of the system for dispensing an aqueous urea solution into an exhaust gas stream, in accordance with the present invention, includes an annular spacer ring disposed between the first and second elongated tubes at a position near the distal end of the first elongated tube. The annular ring has a plurality of grooves, skewed with respect to a longitudinal axis of the first and second elongated tubes, through which compressed air is directed into the mixing chamber.

In another aspect of the present invention, an injection nozzle for dispensing an aqueous urea solution into an exhaust gas stream includes the first elongated tube adapted to convey a solution of urea and water and has a check valve disposed in a distal end. A second elongated tube disposed in concentrically spaced circumscribing relationship around the first elongated tube is adapted to convey compressed air in the space defined by the outer surface of the first elongated tube and the inner surface of the second elongated tube. The second elongated tube has a distal end that extends beyond the distal end of the first elongated tube, thereby forming a mixing chamber between the distal end of the first elongated tube and the distal end of the second elongated tube. The distal end of the second elongated tube has a plurality of openings, each of which are adapted to provide a controlled air-assisted spray of solution of urea and water into the exhaust gas.

Other features of the injection nozzle for dispensing an aqueous urea solution into an exhaust gas stream includes the mixing chamber formed between the respective distal ends of the first and second elongated tubes having a length that is less than the outer diameter of this second elongated tube.

Still another feature of the injection nozzle for dispensing an aqueous urea solution, in accordance with the present invention, includes the first elongated tube having a pulsewidth-modulated flow control valve mounted therewith in spaced relationship with respect to the distal end of the tube.

In yet another aspect of the present invention, a method for injecting an aqueous urea solution into an exhaust gas stream includes providing a source of pressurized solution of urea and water and a source of compressed air. The pressurized solution of urea and water are conveyed through a first elongated tube. A continuous flow of compressed air is conveyed an annular space defined between a second elongated tube concentrically disposed in circumscribing relationship around the first elongated tube and into a mixing chamber defined between spaced apart distal ends of the first and second elongated tubes. The pressurized solution of urea and water is discharged from the distal end of the first elongated tube into a mixing chamber that gets into the mixing chamber in a series of modulated discreet pulsed injections. The discharged pressurized solution of urea and water is mixed with the compressed air in the mixing chamber. A back flow of the mixed solution of urea and water with compressed air from the mixing chamber into the first elongated tube is prevented during the period between each of the discreet pulsed injections. The mixed solution of urea and water with compressed air is sprayed from the mixing chamber through a plurality of openings provided in the distal end of the second elongated tube and into the exhaust gas stream.

Other features of the method for injecting an aqueous urea solution into an exhaust gas stream, in accordance with the present invention, include imparting a swirling motion to the compressed air prior to mixing with the solution of urea and water in the mixing chamber. The method further includes maintaining the compressed air discharged into the mixing chamber at a pressure less than a pressure at which the solution of urea and water is discharged into the mixing chamber.

BRIEF DESCRIPTION OF THE DRAWINGS

A more complete understanding of the structure and operation of the present invention may be had by reference to the following description when taken in conjunction with the accompanying drawings, wherein.

DETAILED DESCRIPTION OF THE PREFERRED EMBODIMENT

Figure 1:
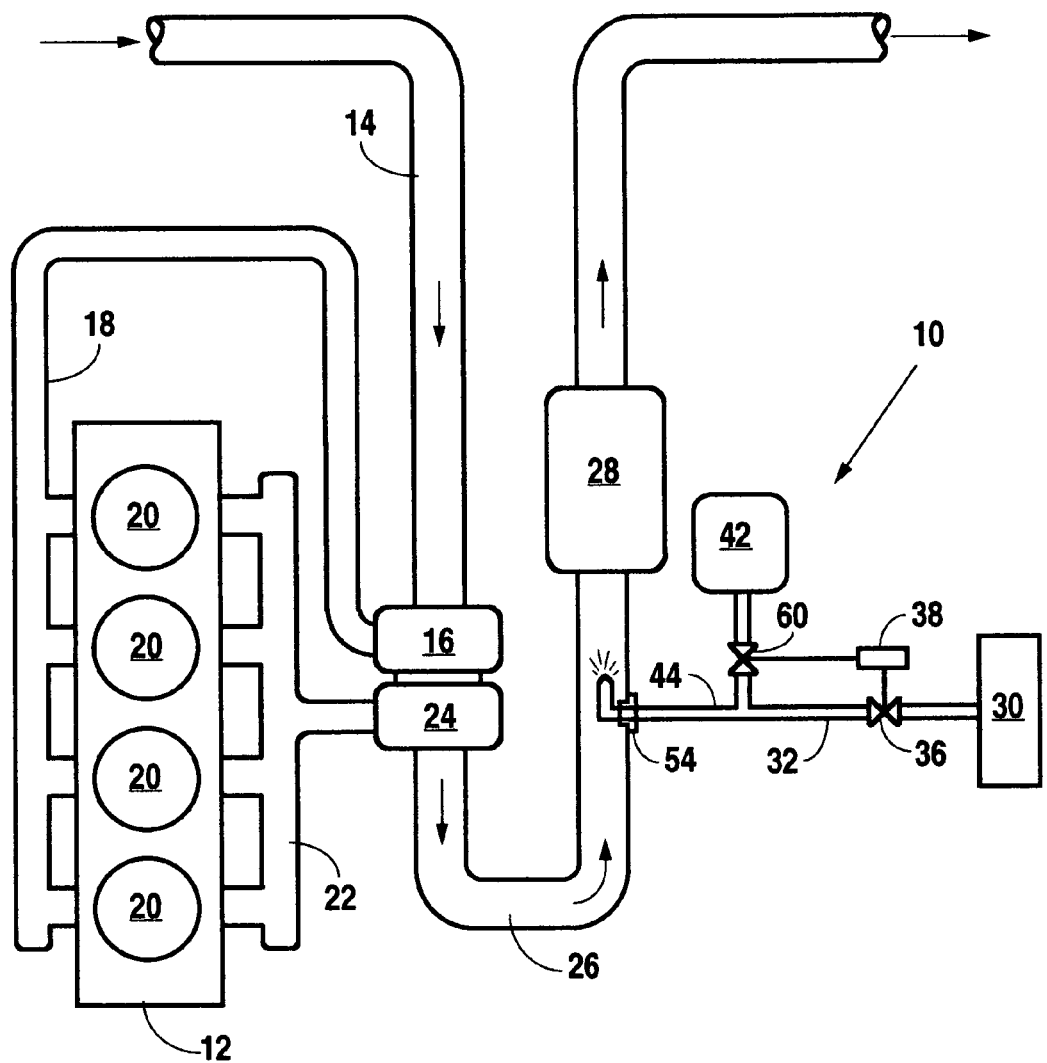
FIG. 1 is a schematic illustration of a representative application of the present invention.
Figure 2:
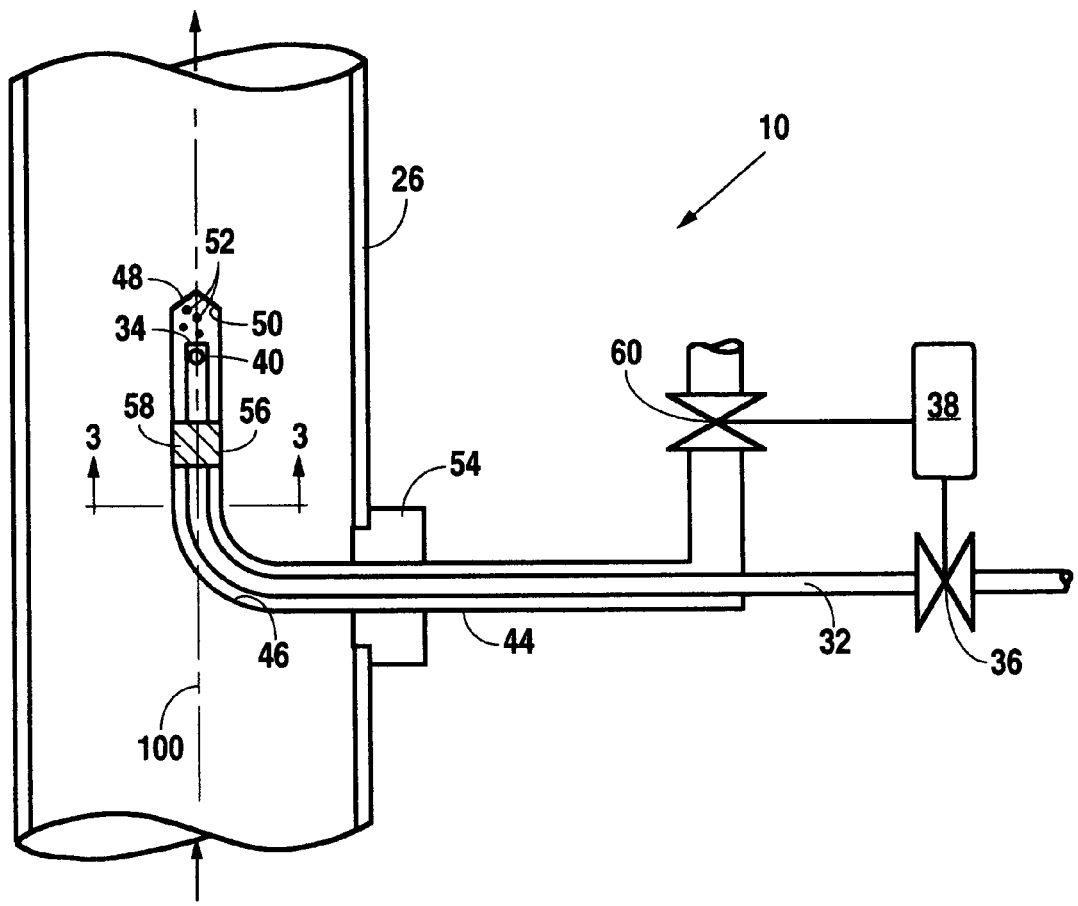
FIG. 2 is an enlarged schematic illustration of the urea and water injection nozzle embodying the present invention.
Figure 3:
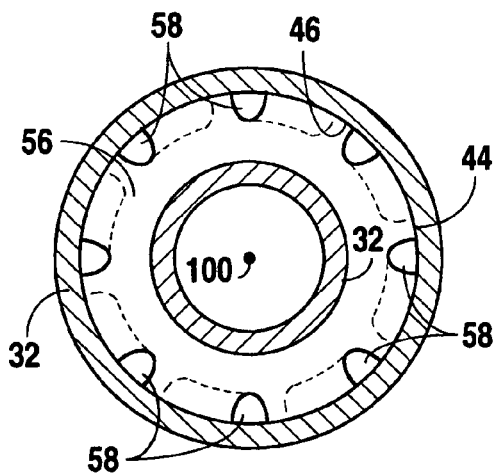
FIG. 3 is an enlarged cross-sectional view of the urea and water injection system embodying the present invention, taken along the lines 3-3 of FIG. 2.

A preferred embodiment of the system for dispensing an aqueous urea solution into an exhaust gas stream is illustrated in FIGS. 1-3. In FIG. 1, an illustrative application for a system for dispensing an aqueous urea solution in an exhaust gas stream, in accordance with the present invention, is generally indicated by the reference numeral 10. In the illustrative application, the system 10 is used to dispense an aqueous urea solution into the exhaust stream of a conventional diesel engine 12. In the simplified illustrated application, the diesel engine 12 has an air intake duct 14 through which an intake air charge is inducted into a compressor stage 16 of a turbocharger and then conducted through an intake manifold 18 into a plurality of combustion chambers 20. The intake air charge is mixed with fuel in the combustion chambers 20, combusted and discharged through an exhaust manifold 22 into a turbine stage 24 of the turbocharger. After discharge from the turbocharger 24, the exhaust gas is conducted through an exhaust duct 26 to a selective catalytic reduction (SCR) exhaust aftertreatment device 28. Selective reduction catalysts use ammonia, or ammonia provided through the decomposition of urea, to reduce oxides of nitrogen ($NO_x$) present in the exhaust stream prior to the exhaust stream being discharged into the ambient atmosphere. In actual practice, the engine 12 may include other components, not shown, such as an exhaust gas recirculation system, an intake air intercooler, additional exhaust gas aftertreatment devices such as a diesel particulate filter and/or other devices, and an exhaust muffler.

Turning now to a detailed description of the present invention, the system 10 for dispensing an aqueous urea solution into an exhaust gas system includes a source 30 of a pressurized solution of urea and water. Urea is a white, odorless, solid, organic compound of carbon, nitrogen, oxygen and hydrogen with the formul($NH_2CO$). Urea is soluble in water and it decomposes at a temperature of about 133° C. to provide ammonia ($NH_3$) for use by the SCR 28 in the reduction of $NO_x$. The aqueous urea solution is conveyed under pressure through a first elongated tube 32 to a distal end 34 of the tube. As shown in Fig. 2, the distal end 34 of the elongated tube 32 is disposed wholly within the exhaust conduit 26.

Flow through the first elongated tube 32 is advantageously controlled by a pulse-width-modulated (PWM) valve 36 that is spaced away from the distal end 34 of the first elongated tube 32. Operation of the PWM valve is controlled by a programmable electronic controller 38. Pulse-width-modulation pulses the valve ON for a percentage of a fixed amount of time (called the period). For example, if a valve is commanded to be 20% open and the period is one minute, the valve will be open for 20% of one minute, i.e., for a time width of 12 seconds, and be closed for the remaining 805, i.e., 48 seconds. Over a course of several periods, the overall result would be a flow equivalent to 20% of the maximum flow rate. The importance of providing a pulse width modulated flow of the urea into the exhaust stream is discussed below in greater detail with respect to describing the enhanced delivery, injection, control and dispersion of the urea into the exhaust stream provided by the present invention. Importantly, a check valve 40 is mounted at the distal end 34 of the first elongated tube 32, and thus also disposed wholly within the exhaust conduit 26.

A source of compressed air 42 is in fluid communication with a second elongated tube 44 that, as best shown in FIGS. 2 and 3, surrounds the first elongated tube 32 in concentrically spaced circumscribing relationship and provides an annular air flow pathway 46 between the outer wall of the first elongated tube 32 and the inner wall of the second elongated tube 44. The second elongated tube 44 has a distal end 48 that extends beyond the distal end 34 of the first elongated tube 32 and forms a mixing chamber 50 disposed wholly within the exhaust conduit 26 at a position between the respective distal ends 34, 48.

In the illustrated engine application of the present invention, the distal end 48 of the second elongated tube 44 with the first elongated tube 32 concentrically enclosed therein is positioned in the center of and wholly within the exhaust duct 26 with the distal end 48 of the second elongated tube 44, and accordingly the distal end 34 of the first elongated tube 32, in coaxial alignment with a predefined central axis 100 of the exhaust duct 26 and directed in the downstream direction of flow of the exhaust gas. The distal end 48 of the second elongated tube 44 has a plurality of openings 52 each adapted to provide a controlled air-assisted spray of the solution of urea and water into the exhaust gas. The assembled first and second elongated tubes 32, 44 are maintained in the coaxially centered position wholly within the exhaust duct 26 by a fitting 54 mounted on the wall of the exhaust duct 26.

In the preferred embodiment of the present invention, an annular spacer ring 56, having an inner diameter substantially equal to the outer diameter of the first elongated tube 32 and an outer diameter substantially equal to the inner diameter to the second elongated tube 44, is positioned between the first and second elongated tubes 32, 44 near the distal end 34 of the first elongated tube 32, and thus also disposed wholly within the exhaust conduit 26. The annular spacer ring 56 maintains the distal ends 34, 48 of the first and second elongated tubes 32, 44 in concentric radially-spaced relationship. A plurality of grooves 58 are formed in the outer circumference of the annular spacer ring 56 in a skewed orientation with respect to the common central axis of the tubes 32, 44 so that a swirling motion is imparted to the compressed air passing through the grooves 58 and into the mixing chamber 50 between the respective distal ends 34,48 of the elongated tubes 32,44.

A pressure regulating flow control valve 60 controls the pressure and flow of compressed air provided by the source of compressed air 42 into the annular flow pathway 46 between the first and second elongated tubes 32, 44. To assure an adequate flow of compressed air into the mixing chamber 50, the cross-sectional area of the grooves 58 in the annular spacer ring 56 desirably have a collective cross-sectional area that is greater, for example on the order of about ten times greater, than the collective cross-sectional area of the openings 52 provided in the distal end 48 of the second elongated tube 44 through which the urea solution is sprayed into the exhaust gas stream.

From the above description it can be seen that the first and second elongated tubes 32, 44 cooperate to provide an injection nozzle disposed wholly within the exhaust conduit 26 for dispensing an aqueous urea solution into an exhaust gas stream. By way of an illustrative example of the present invention, the first elongated tube 32 is a constructed of stainless steel and has an outer diameter of 0.25 inches (6.35 mm). The, second elongated tube 44 is also constructed of stainless steel tube and has an outer diameter of 0.50 inches (12.7 mm). Six holes 52 extend through the distal end 48 of this second elongated tube 44. Each of the openings 52 has a diameter of about 0.02 inches (0.6 mm). The mixing chamber 50 disposed wholly within the exhaust conduit 26 has a length that is less than the outer diameter of the second elongated tube, i.e., about 0.75 inches (19.05 mm).

Importantly, the pressure of the compressed air is controlled so that the pressure of the compressed air after passing through the grooves 58 in the annular spacer ring 56 and into the mixing chamber 50 has a pressure less than that of the urea solution discharged into the mixing chamber 50 through the first elongated tube 32.

In carrying out the method for injecting an aqueous urea solution into an exhaust gas stream, in accordance with the present invention, a pressurized solution of urea and water is conveyed from the source 30 through the first elongated tube 32 to the distal end 34 of the tube and into the mixing chamber 50. Importantly, the urea and water solution is discharged into the mixing chamber 50 in a series of controlled, discreet, pulsed injections, the duration (pulse width) and period of which are controlled by the PWM valve 36. Concurrently, a continuous flow of compressed air is conveyed through the annular flow pathway 46 between the inner wall of the second elongated tube 44 and the outer wall of the first elongated tube 32, through the grooves 58 in the annular spacer ring 56, and into the mixing chamber 50. The check valve 40 disposed in the distal end 34 of the first elongated tube 32 prevents a back flow of the aqueous urea solution and/or compressed air into the first elongated tube 32 between the pulsed discharge of the urea solution from the first elongated tube 32. The swirling motion of the compressed air into the mixing chamber 50 and the high velocity air flow of the compressed air into the mixing chamber 50 promote a uniform flow of the urea-water solution through the multiple openings 52 in the distal end 48 of the second elongated tube.

As described above, the mixing chamber 50 has only a small volume, thereby limiting the residence time of the urea-water solution in the mixing chamber 50, the evaporation of water from the solution is substantially eliminated. Thus, the problem of atomizer plugging inherent in present urea dispensing systems which either mix air with the urea-water solution upstream of the discharge openings or expose the urea-water conveying tube to elevated exhaust temperatures whereby the solution is heated and water evaporated, is avoided. Moreover, the urea dispensing system 10 embodying the present invention surrounds the urea-water supply tube 32 with an air tube 42 through which a thermally protective continuous flow of air surrounds the liquid supply tube 32 and minimizes heating of the liquid conveyed through the tube. Thus, the urea-water solution is maintained at a relatively low temperature, allowing the coaxial tubes 32, 44 to be positioned in the exhaust duct 26 so that the spray discharge into the exhaust stream is axially aligned with the center line 100 of the exhaust duct 26 to optimize the urea-water spray distribution. Moreover, since the urea-water solution is not exposed to the drying effects of air during conveyance through the supply tube 32 between the PWM valve 36 and the mixing chamber 50, more atomizing air can be used to produce a finer spray and faster evaporation without concern about drying out the water in the urea-water mixture upstream of the mixing chamber 50. Different spray tip configurations may be provided as appropriate for different applications.

Figure 4:
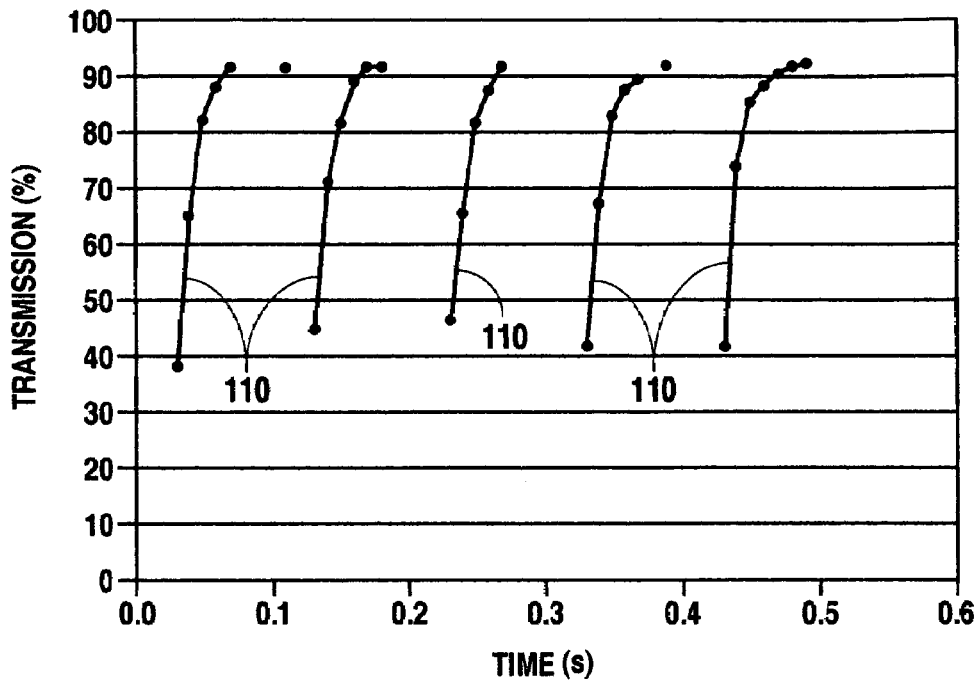
FIG. 4 is an optical density graph of the controlled, uniformly reproducible, discreet, pulse-injected flow of a urea-water mixture from the tip of the injector system embodying the present invention.
Figure 5:
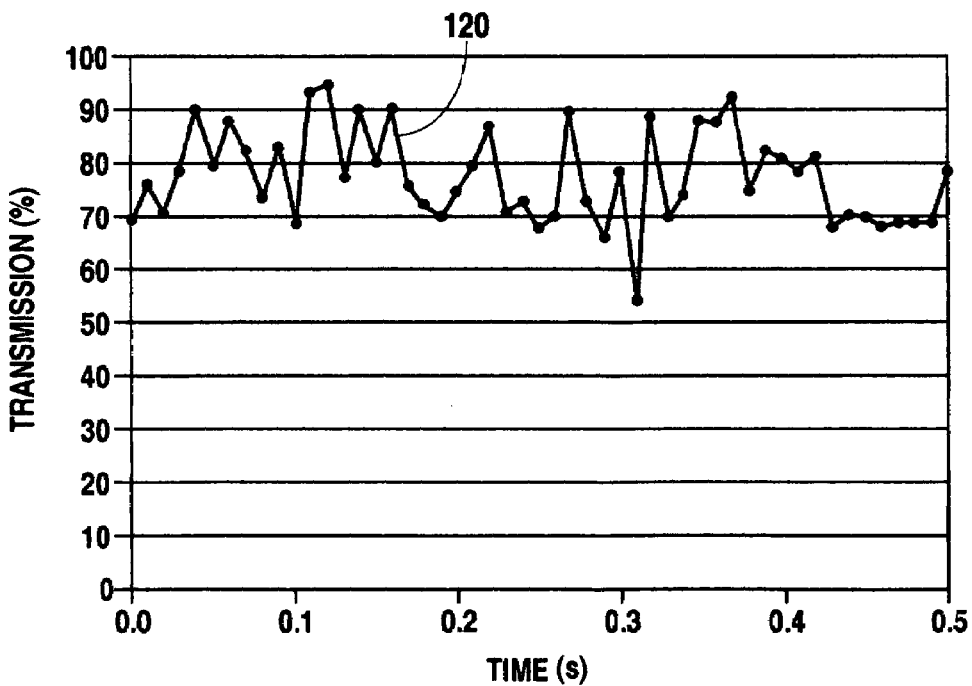
FIG. 5 is an optical density graph of the erratic injection of a urea-water solution provided by current injection systems.

The significant improvement in the control of flow of a urea-water mixture from the openings 52 in the tip of the injector nozzle embodying the present invention, as compared to a conventional atomizer, is dramatically illustrated in FIGS. 4 and 5. In both spray density tests, the PWM valve 36 was controlled to provide a pulse-width of 10 ms at a period of 100 ms, and spray density was measured as percent of light transmission versus time. FIG. 4 illustrates the spray discharge provided by the present invention, in which each opening of the PWM valve 36 results in a separate distinct spray being emitted through the openings 52. The individual ejection events are clearly visible. Between the individual pulses, the continuous flow of compressed air through the mixing chamber 50 advantageously purges the mixing chamber 50 of any residual urea-water solution and thereby provides a consistent mixing volume for each pulsed release into the mixing chamber 50. In marked contrast, FIG. 5 representative of current urea injection systems clearly illustrates how slugs of the urea-water mixture migrate through the supply tube and often preferentially sprays out of only one or two of the several holes in the atomizer tip, especially at low liquid rates. As illustrated by optical density transmission, the spray volume is erratic, making consistent, accurate controlled distribution of the urea into the exhaust gas stream extremely difficult.

Accurate control of urea released into the exhaust stream is extremely important. If insufficient urea is dispensed into the exhaust stream, there will be insufficient ammonia present for use by the SCR 28 to reduce $NO_x$ and, accordingly, $NO_x$ emissions will be excessive. However, ammonia is toxic and must be prevented from being discharged into the atmosphere. If more urea is dispensed, and consequently more ammonia released, into the exhaust stream than is used by the SCR 28 in the reduction of $NO_x$, the excess ammonia will be undesirably discharged into the atmosphere.

From the above discussion and description of the system for dispensing an aqueous urea solution into an exhaust gas stream, it can be seen that the present invention provides a urea dosing system that significantly reduces plugging of the atomizer tip compared to conventional urea dosing systems since water does not have significant exposure to the atomizing air. Furthermore, the present invention enables the atomizer tip to be located in the middle of the exhaust system rather than at an elbow since water in the solution is in the urea-water solution is much less likely to be evaporated. Also, it could be seen that atomization quality of the spray released into the exhaust gas stream is greatly improved relative to that of conventional air-assisted urea atomizers since more atomizing air can be used without concern about drying out the mixture upstream of the discharge openings.

Although the present invention is described in terms of a preferred illustrative embodiment and illustrative application, those skilled in the art will recognize that variations on the described embodiment can be made in carrying the present invention. For example, the size of the urea-water and compressed air delivery tubes, the size and number of the openings in the distal end of the compressed air delivery tube, the design of the annular spacer ring can be varied to meet specific application requirements. Also, the distal end of the second elongated tube, through which compressed air is conveyed, may be replaced by a spray tip adapted for specific applications. Also, it should be noted that the present invention is applicable to vehicular and stationary engines as well as industrial furnaces and boilers. Such applications, arrangements and modifications embodying the present invention are intended to fall within the scope of the following Other aspects, features, and advantages of the present invention may be obtained from the study of this disclosure and the drawings, along with the appended claims.

What we claim is:

1. A system for dispensing an aqueous urea solution into an exhaust gas stream, comprising:
    a source of a pressurized solution of urea and water;
    a source of compressed air;
    a first elongated tube in controlled fluid communication with said source of pressurized solution of urea and water and having a check valve disposed in a distal end of said first elongated tube;
    a second elongated tube in controlled fluid communication with said source of compressed air, said second elongated tube being disposed in concentrically spaced circumscribing relationship around said first elongated tube and having a distal end extending beyond the distal end of the first elongated tube thereby forming a mixing chamber between the distal end of said first elongated tube and the distal end of said second elongated tube, said distal ends of the first and second elongated tubes and said mixing chamber being wholly positioned within an exhaust conduit through which exhaust gas is discharged from a combustion chamber, and said second elongated tube having a plurality of openings therein each adapted to provide a controlled air-assisted spray of the solution of urea and water into said exhaust gas.

2. The system for dispensing an aqueous urea solution into an exhaust gas stream, as set forth in claim 1, wherein said mixing chamber formed between the respective distal ends of the first and second elongated tubes has a length that is less than a predefined outer diameter of the second elongated tube.

3. The system for dispensing an aqueous urea solution into an exhaust gas stream, as set forth in claim 1, wherein said system includes a pulse-width-modulated flow control valve disposed between said source of the pressurized solution of urea and water and the distal end of said first elongated tube, said pulse-width-modulated flow control valve being spaced from said exhaust conduit.

4. The system for dispensing an aqueous urea solution into an exhaust gas stream, as set forth in claim 1, wherein said system includes an annular ring disposed wholly within said exhaust conduit between said first and said second elongated tubes at a position proximate the distal end of said first elongated tube, said annular ring having a plurality of grooves formed therein through which compressed air is directed into said mixing chamber, said grooves being skewed with respect to a predefined longitudinal axis of the first and second elongated tubes.

5. The system for dispensing an aqueous urea solution into an exhaust gas stream, as set forth in claim 4, wherein said grooves in the annular ring have a defined collective cross-sectional area, and said plurality of openings in the distal end of said second elongated tube have a collective cross-sectional area that is about 10% of the collective cross-sectional area of said grooves in said annular ring.

6. An injection nozzle for dispensing an aqueous urea solution into an exhaust gas stream, comprising:
    a first elongated tube adapted to convey a solution of urea and water and having a check valve disposed in a distal end thereof, said distal end bein disposed wholly within an exhaust conduit through which said exhaust gas stream is discharged from a combustion chamber of engine;
    a second elongated tube having a distal end disposed wholly within an exhaust conduit through which said exhaust gas stream is discharged in concentrically spaced circumscribing relationship around said first elongated tube, said second elogated tube being adapted to convey compressed air through an annular space defined by an outer surface of the distal end of the first elongated tube and an inner surface of the distal end of the second elongated tube, said distal end of the second elongated tube extending beyond said distal end of the first elongated tube thereby forming a mixing chamber between the distal end of said first elongated tube and the distal end of said second elongated tube, said distal end of the second elongated tube having a plurality of openings therein each adapted to provide a controlled air-assisted spray of the solution of urea and water into said exhaust gas.

7. The injection nozzle for dispensing an aqueous urea solution into an exhaust gas stream, as set forth in claim 6, wherein said mixing chamber formed between the respective distal ends of the first and second elongated tubes is disposed wholly within said exhaust gas conduit and has a length that is less than a predefined outer diameter of the second elongated tube.

8. The injection nozzle for dispensing an aqueous urea solution into an exhaust gas stream, as set forth in claim 6, wherein said injection nozzle is disposed in an exhaust conduit through which products of combustion are discharged from a combustion chamber, and said first elongated tube has a pulse-width-modulated flow control valve mounted thereon in spaced relationship with respect to said distal end and said exhaust conduit.

9. The injection nozzle for dispensing an aqueous urea solution into an exhaust gas stream, as set forth in claim 6, wherein said nozzle includes an annular ring disposed wholly within said exhaust conduit between said first and said second elongated tubes at a position proximate the distal end of said first elongated tube, said annular ring having a plurality of grooves formed therein through which compressed air present in said second elongated tube is directed into said mixing chamber, said grooves being skewed with respect to a predefined longitudinal axis of the first and second elongated tubes.

10. The injection nozzle for dispensing an aqueous urea solution into an exhaust gas stream, as set forth in claim 9, wherein said grooves in the annular ring have a defined collective cross-sectional area, and said plurality of openings in the distal end of said second elongated tube have a collective cross-sectional area that is about 10% of the collective cross-sectional area of said grooves in said annular ring.

11. A method for injecting an aqueous urea solution into an exhaust gas stream, comprising:
   providing a source of a pressurized solution of urea and water;
   providing a source of compressed air;
   conveying said pressurized solution of urea and water through a first elongated tube having a distal end disposed wholly within said exhaust as stream;
   conveying a continuous flow of compressed air through an annular space defined between a second elongated tube having a distal end wholly disposed within said exhaust gas stream in circumscribing relationship around said first elongated tube, said continuous flow of compressed air being further conveyed into a mixing chamber defined between spaced apart distal ends of said first and said second elongated tubes;
   discharging said pressurized solution of urea and water from the distal end of said first elongated tube into said mixing chamber, said discharging being carried out in a series of discreet pulsed discharge events;
   mixing said discharged pressurized solution of urea and waler with compressed air in said mixing chamber;
   preventing a backflow of said mixed solution of urea and water with compressed air from said mixing chamber into said first elongated tube between each of said discreet pulsed discharge events; and
   spraying said mixed solution of urea and water with compressed air from said mixing chamber through a plurality of openings provided in the distal end of said second elongated tube and into said exhaust gas stream.

12. The method for injecting an aqueous urea solution into an exhaust gas stream, as set forth in claim 11, wherein said method includes imparting a swirling motion to said compressed air prior to mixing with said solution of urea and water in said mixing chamber.

13. The method for injecting an aqueous urea solution into an exhaust gas stream, as set forth in claim 11, wherein said compressed air discharged into said mixing chamber is maintained at a pressure less than a pressure at which said solution of urea and water is discharged into said mixing chamber.

* * * * *